United States Patent [19]

Logan et al.

[11] 4,013,101

[45] * Mar. 22, 1977

[54] HOSE CONSTRUCTION

[75] Inventors: Arthur D. Logan; James B. Rush, both of Waynesville, N.C.

[73] Assignee: Dayco Corporation, Dayton, Ohio

[ * ] Notice: The portion of the term of this patent subsequent to Nov. 25, 1992, has been disclaimed.

[22] Filed: Nov. 18, 1975

[21] Appl. No.: 633,060

Related U.S. Application Data

[63] Continuation-in-part of Ser. No. 452,471, March 18, 1974, Pat. No. 3,921,674.

[52] U.S. Cl. .............................. 138/130; 138/122; 138/174
[51] Int. Cl.² ......................................... F16L 11/08
[58] Field of Search .......... 138/129, 130, 132, 122, 138/121, 174; 428/910

[56] References Cited

UNITED STATES PATENTS

| 2,430,081 | 11/1947 | Roberts et al. | 138/122 X |
| 2,674,297 | 4/1954 | Greenwald | 138/122 X |
| 2,917,568 | 12/1959 | Moorman et al. | 138/122 X |
| 2,973,783 | 3/1961 | Boe | 138/130 |
| 3,872,893 | 3/1975 | Roberts | 138/121 |
| 3,921,674 | 11/1975 | Logan et al. | 138/130 |

Primary Examiner—Richard E. Aegerter
Assistant Examiner—James E. Bryant III
Attorney, Agent, or Firm—Reuben Wolk

[57] ABSTRACT

A hose construction including a corrugated and a curved construction and method of making same are provided and the hose construction comprises at least one layer portion made primarily of an elastomeric material having randomly distributed elongated fibers embedded therein in substantially parallel relation with the fibers extending in a helical pattern about a reference axis of the hose construction and at an angle relative thereto.

12 Claims, 23 Drawing Figures

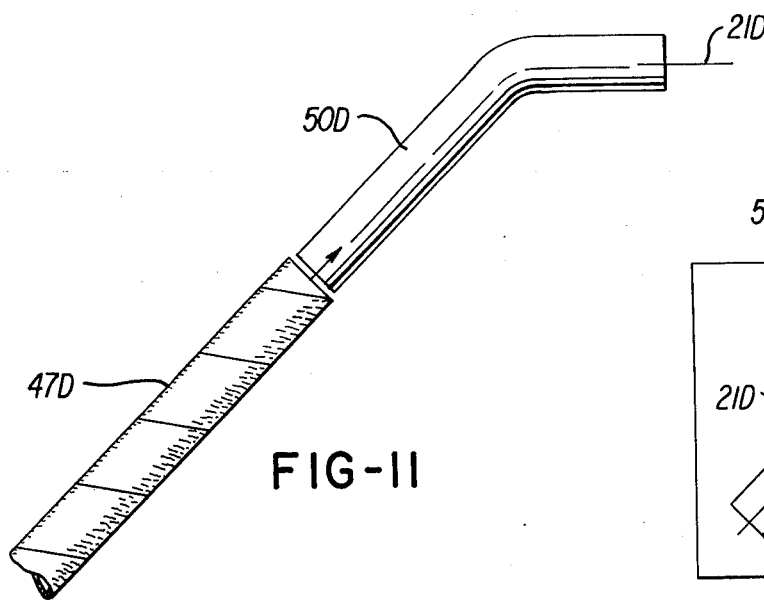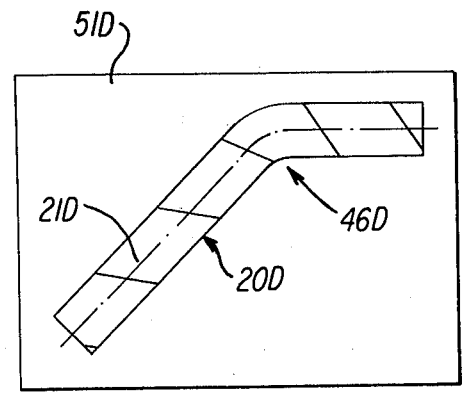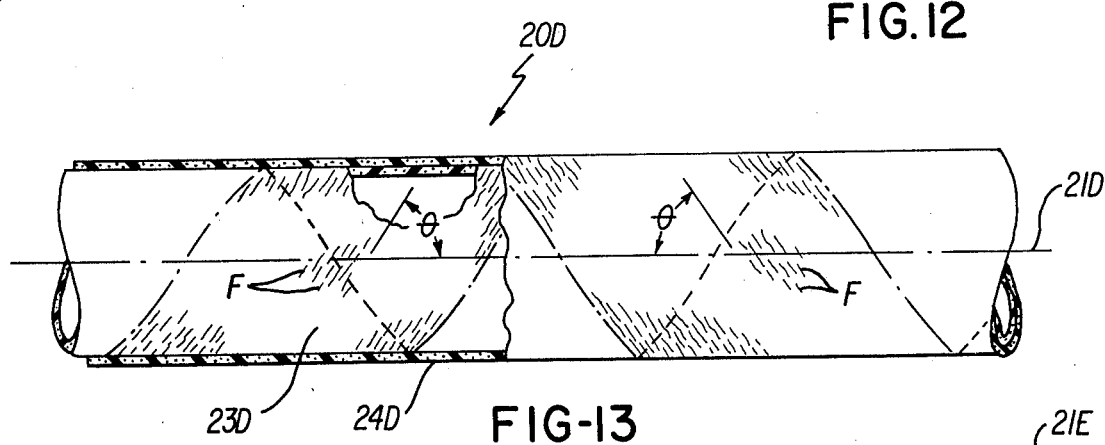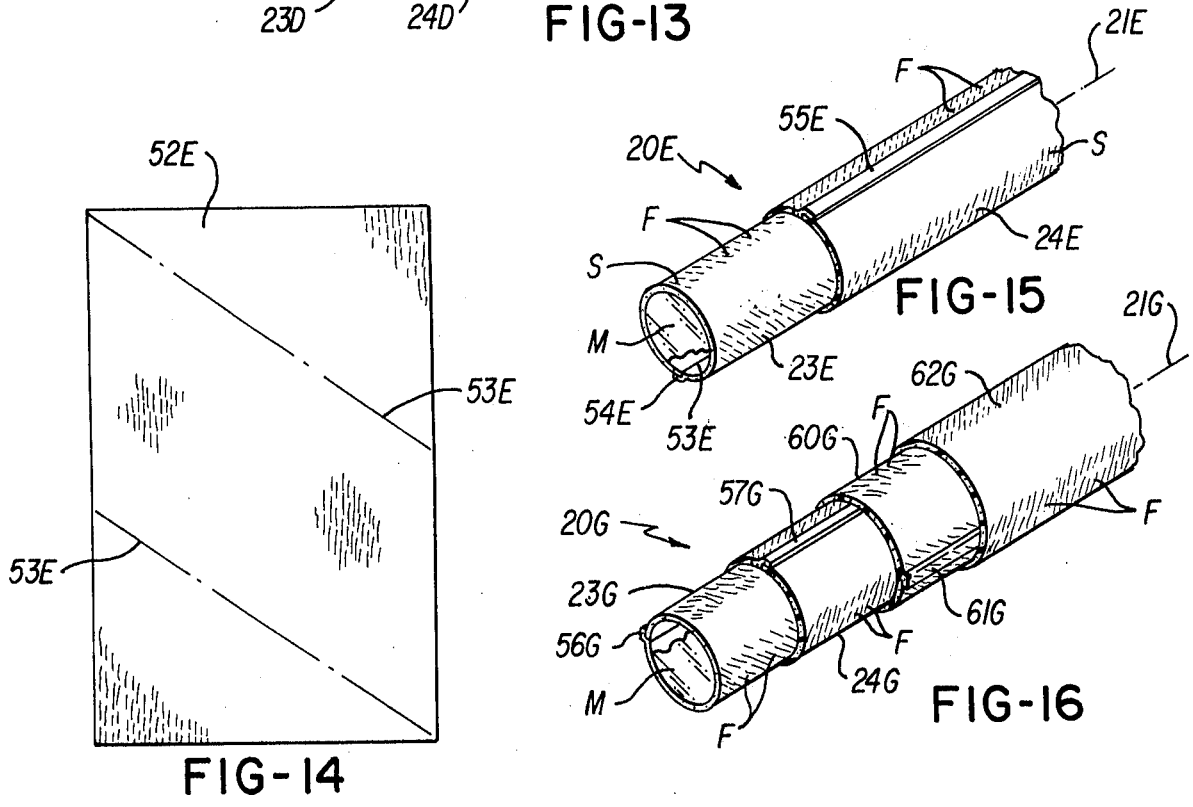

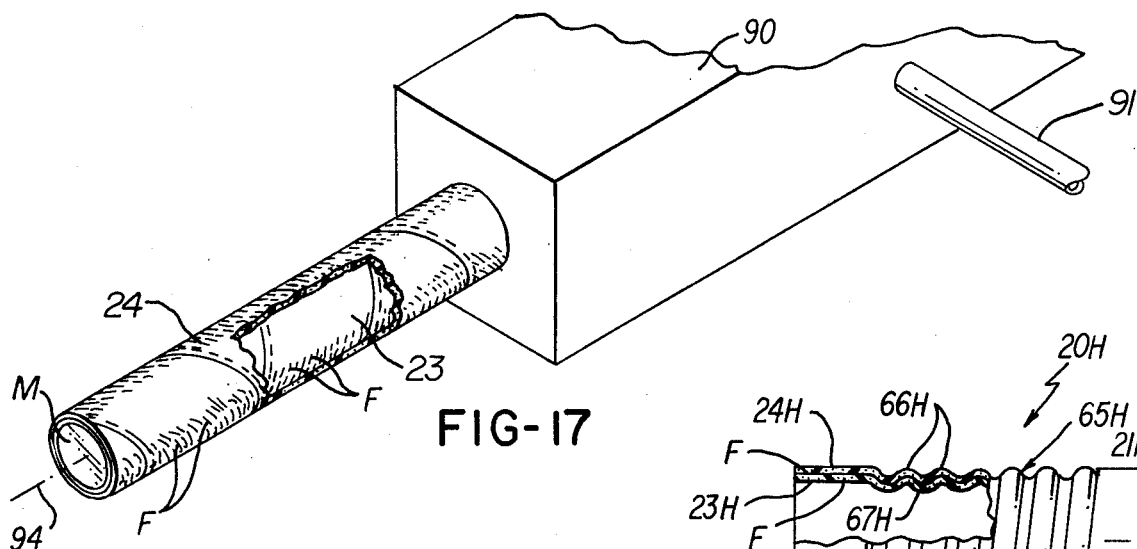

FIG-17

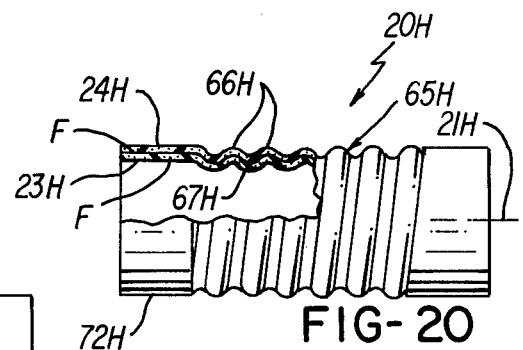

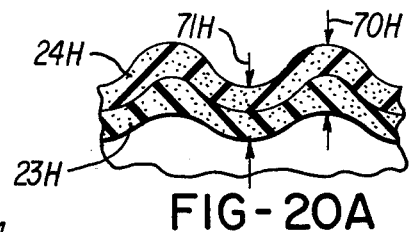

FIG-22

| 73 |
|---|
| FORMING AN ELONGATED TUBULAR CONSTRUCTION HAVING A REFERENCE AXIS AND AT LEAST ONE LAYER MADE PRIMARILY OF AN ELASTOMERIC MATRIX MATERIAL WHICH HAS RANDOMLY DISTRIBUTED ELONGATED FIBERS EMBEDDED THEREIN IN SUBSTANTIALLY PARALLEL RELATION WITH THE FIBERS EXTENDING IN A HELICAL PATTERN ABOUT THE AXIS AT AN ANGLE RELATIVE THERETO |

| 74 |
|---|
| PARTIALLY CURING THE TUBULAR CONSTRUCTION |

| 75 |
|---|
| PLACING THE PARTIALLY-CURED TUBULAR CONSTRUCTION IN A MOLD DEVICE HAVING AXIALLY SPACED CORRUGATIONS COMPRISING ITS WALL MEANS |

| 80 |
|---|
| FINAL FORMING AND CURING THE PARTIALLY-CURED TUBULAR CONSTRUCTION BY URGING IT AGAINST THE WALL MEANS WHILE SUBJECTING SUCH TUBULAR CONSTRUCTION TO A CONTROLLED ENVIRONMENT TO FORM A FIBER-REINFORCED HOSE CONSTRUCTION HAVING AXIALLY SPACED CORRUGATIONS DEFINED BY ALTERNATING CRESTS AND TROUGHS OF SUBSTANTIALLY UNIFORM WALL THICKNESS |

FIG-18

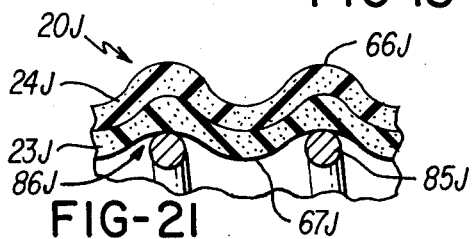

FIG-21

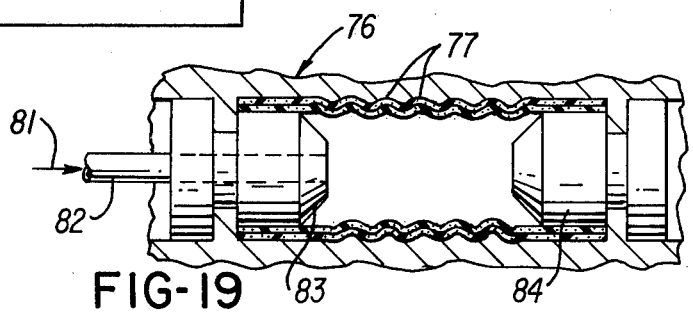

FIG-19

HOSE CONSTRUCTION

CROSS-REFERENCE TO RELATED APPLICATION

This application is a continuation-in-part of co-pending parent application Ser. No. 452,471, filed Mar. 18, 1974 and now U.S. Pat. No. 3,921,674.

BACKGROUND OF THE INVENTION

There are numerous applications in industry which utilize hose constructions including corrugated hose constructions made primarily of elastomeric materials; and, in applications which are considered of comparatively low pressure, i.e., generally of the order of 100 psig or less, each hose construction is usually made of three main components in the form of a base tube which is used to contain a working fluid, a reinforcement which is used to provide the hose with dimensional stability and increase the strength thereof against bursting pressures, and a cover component to protect the reinforcement and base tube against mechanical damage and/or chemical attack.

In previously proposed low pressure hose constructions of the type used for automobile radiators, and the like, it is usually necessary to laminate or otherwise apply an elastomeric base tube on an associated mandrel, apply a reinforcement over the base tube by knitting, wrapping, or braiding, or the like, to define an assembly, followed by extrusion or lamination of a suitable elastomeric protective cover over the assembly, and finally curing the assembly whereby it is necessary with present hose constructions to go through numerous comparatively expensive steps and utilize special equipment in order to produce a comparatively simple hose construction thereby resulting in substantially increasing the cost of such a hose construction. Further, in applications where it is desired to provide greater flexibility for a hose construction of the character mentioned corrugations are provided therein and in addition to the usual higher cost of providing corrugations the usual techniques employed heretofore to provide such corrugations have resulted in corrugations having crests which are much greater in thickness than the troughs thereof thus providing a poor hose construction.

SUMMARY

It is a feature of this invention to provide a simple and economical hose construction and method of making same which results in reduced material costs inasmuch as several reinforcing elements usually provided in previously proposed hose constructions are not required, reduced labor costs inasmuch as a major step usually required in applying reinforcement means is elminiated, and the provision of a hose construction which lends itself to high volume production and automation.

Another feature of this invention is the provision of a corrugated hose construction and method of making same wherein such hose construction has integral crests and troughs which have a substantially uniform wall thickness throughout due to having been formed from a paritally-cured elastomeric tubular construction.

Another feature of this invention is the provision of a hose construction having a reference axis and at least one layer portion made primarily of an elastomeric matrix material having randomly distributed elongated fibers embedded therein in substantially parallel relation with the fibers extending in a helical pattern about the axis at an angle relative thereto and providing reinforcement for said hose construction.

Another feature of this invention is the provision of an improved preformed curved hose construction.

Accordingly, it is an object of this invention to provide a hose construction and method of making same having one or more of the novel features set forth above or hereinafter shown or described.

Other details, features, objects, uses and advantages of this invention will be readily apparent from the exemplary embodiments thereof presented in the following specification, claims, and drawings.

BRIEF DESCRIPTION OF THE DRAWINGS

The accompanying drawings show present preferred embodiments of this invention, in which

FIG. 11 is a view illustrating disposing a rectilinear tubular construction on a curved mandrel to enable curing thereof in a curved configuration to define another exemplary embodiment of the hose construction of this invention.

FIG. 12 is a schematic view showing the tubular construction of FIG. 11 as disposed on its curved mandrel being cured in a conventional curing device;

FIG. 13 is an enlarged fragmentary view with parts in cross section, parts in elevation, and parts broken away particularly illustrating a straight portion of the completed curved hose construction of FIG. 12 after cooling and removal from its curved mandrel;

FIGS. 14 and 15 illustrate a pair of consecutive special method steps which may be used to make a hose construction similar to the hose construction of FIG. 3, using wide sheets of bias cut material wherein each sheet has elongated reinforcing fibers embedded therein with such fibers being arranged in substantially parallel relation;

FIG. 16 is a perspective view with parts in cross section, parts in elevation, and parts broken away illustrating a hose construction made essentially as shown in FIGS. 14 and 15 yet having an additional two layers made from two additional fiber reinforced sheets with the four sheet-formed layers being bonded together as a unitary mass or structure;

FIG. 17 is a view similar to FIG. 10 showing the simultaneous formation by extrusion process of a plurality of two ribbons of elastomeric matrix material and the application thereof about an associated mandrel to define a tubular construction with each ribbon having elongated reinforcing fibers embedded therein and arranged parallel to the elongated dimension of each ribbon and with the fibers being in a helical pattern about the longitudinal axis of the tubular construction;

FIG. 18 is a block presentation of the method of this invention as modified to define another exemplary embodiment of the hose construction of this invention in the form of a corrugated hose construction;

FIG. 19 is a view showing a typical tubular construction after partial curing thereof and showing such tubular construction being final formed and cured in a mold device having axially spaced corrugations comprising its wall means;

FIG. 20 is a view with parts in cross section, parts in elevation, and parts broken away of a typical corrugated hose construction made as disclosed in FIGS. 18 and 19 and having integral corrugations therein defined by a continuous helical corrugation;

FIG. 20A is an enlarged fragmentary view of the hose construction of FIG. 20 showing the relative thicknesses of the crests and troughs of the corrugated wall thereof;

FIG. 21 is a fragmentary view similar to FIG. 20A showing a modification of the hose construction of FIG. 20 reinforced with a helically formed wire; and FIG. 22 is a fragmentary view similar to FIG. 20 of a hose construction having corrugations therein in the form of annular corrugations.

DETAILED DESCRIPTION

Figure 1:
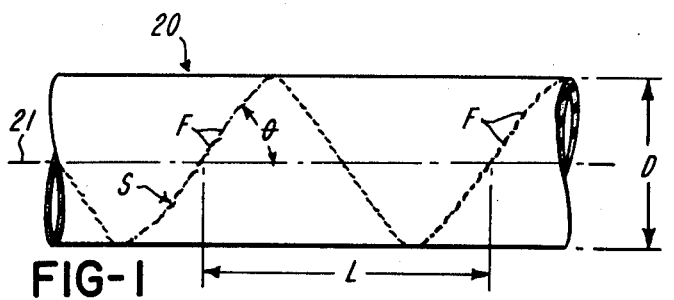
FIG. 1 is a schematic presentation of one exemplary embodiment of the hose construction of this invention particularly illustrating reinforcing means in the form of one set of a plurality of elongated fibers arranged in end-to-end aligned relation in a helical pattern about a hose construction to define what may be considered a single strand with the strand being arranged at an angle $\theta$ relative to a longitudinal axis through the hose construction.

To facilitate an understanding of the present invention the following presentation is made of theoretical considerations in elastomeric hose design followed by various exemplary embodiments of the hose construction and method of making same.

In particular, the pressure acting in an elongated hose construction arranged with its longitudinal axis extending horizontally may be resolved into two principal components, a horizontal force or end thrust and a vertical force or hoop stress.

The horizontal force may be expressed by the formula:

$$H = \frac{P \times \pi \times D^2}{4} \qquad \text{Equation 1}$$

The vertical force may be expressed by the formula:

$$V = \frac{P \times D \times L}{2} \qquad \text{Equation 2}$$

Where:
H = horizontal force
V = vertical force
P = internal pressure
D = diameter of hose In reinforced hose constructions, it has been found that the most effective use of reinforcing material, whether in the form of wire, fabric, etc., is obtained when the load-bearing elements of the reinforcing material are aligned parallel with the forces acting in the hose wall when pressure is applied. In general, the resultant R of the vertical V and horizontal H components of forces due to internal pressure can be represented by the resultant R on a parallelogram of forces commonly employed in physics wherein the vertical force V is represented as a line starting from a fixed point and extends vertically, the horizontal force H is represented as a line which extends horizontally from such fixed point, and the resultant R extends from such fixed point as a diagonal line of the parallelogram at an included angle, which will be referred to as angle $\theta$, between the horizontal line H and the resultant R. Accordingly, a relationship may be expressed between the vertical force V and the horizontal force H by the equation:

$$\text{Tan } \theta = \frac{V}{H} \qquad \text{Equation 3}$$

It is therefore apparent that each reinforcing element in the wall of an ideal hose construction should be arranged to lie parallel with the resultant R, and this means that each must be arranged at an angle $\theta$ relative to the central horizontal axis of the hose construction. To emphasize this concept, reference is now made to FIG. 1 of the drawings where what will be referred to as a single strand S of reinforcing material is shown schematically as such a strand S would be ideally arranged in an exemplary hose construction 20 of this invention. The strand S is comprised of a plurality of aligned end-to-end fibers F which extend in a helical pattern about the hose construction 20 and although as a practical matter the fibers F would probably not be arranged in precise end-to-end relation as shown, such fibers would be sufficiently aligned that they would be in substantially end-to-end relation in a very large number of sets of fibers as are present in the hose construction of this invention. It will also be appreciated that a more conventional reinforcing element or material, such as a wire, fabric, or the like would also be similarly arranged as the strand S.

Figure 2:
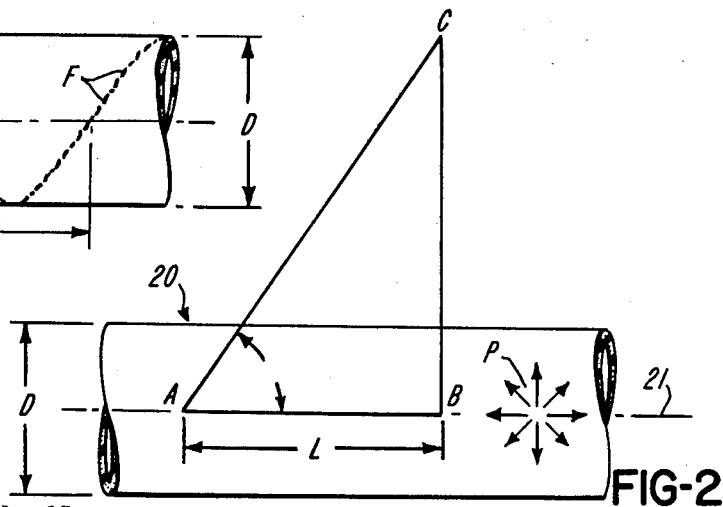
FIG. 2 is a presentation of the reinforcing strand of FIG. 1 in a planar diagram.

The reinforcing strand S of FIG. 1 is arranged in a helical pattern having a pitch length L and extends at an angle $\theta$ relative to the axis; and, such reinforcing strand may be represented in a planar diagram as shown in FIG. 2 wherein:

P = internal pressure
L = pitch length of reinforcing strand S
AC = length of strand in one pitch
BC = circumference of the hose construction
From FIG. 2 it is apparent that $$\text{Tan } \theta = \frac{BC}{AB} = \frac{\text{circumference}}{\text{pitch}} = \frac{\pi D}{L} \quad \text{Equation 4}$$

Equation 4 may be rearranged and expressed:

$$L = \frac{\pi D}{\text{Tan } \theta} \quad \text{Equation 5}$$

However, from Equation 3, it is seen that:

$$\text{Tan } \theta = \frac{V}{H}$$

and the values for H and V are given in Equations 1 and 2 respectively so that upon subsitituting Equations 1 and 2 in $$\text{Tan } \theta = \frac{V}{H}$$

the following equation is obtained:

$$\text{Tan } \theta = \left[ \frac{P \times D \times L}{2} \right] \div \left[ \frac{P \times \pi \times D^2}{4} \right]$$

which may be rearranged to:

$$\text{Tan } \theta = \frac{4 \times P \times D \times L}{2 \times P \times \pi \times D^2}$$

which simplifies to:

$$\text{Tan } \theta = \frac{2L}{\pi D} \quad \text{Equation 6}$$

However, the value of L is known from Equation 5 above and substituting this value of L into Equation 6 gives:

$$\text{Tan } \theta = 2 \left[ \frac{\pi D}{\text{Tan } \theta} \right] \div \pi D$$

which may be rearranged to:

$$\text{Tan } \theta = \frac{2 \pi D}{\pi D \text{ Tan } \theta}$$

which simplifies to:

$$\text{Tan } \theta = \frac{2}{\text{Tan } \theta}$$

or $\text{Tan}^2 \theta = 2$ Equation 7 Equation 7 may be written:

$$\text{Tan } \theta = \sqrt{2} = 1.414 \quad \text{Equation 8}$$

From which:

$$\theta = 54° 44'$$

This angle $\theta$ of 54° 44' may be called the "neutral angle" and is the optimum angle at which any reinforcing means should be arranged relative to the longitudinal axis such as axis 21 of hose construction 20. The angle $\theta$ is independent of hose dimensions or internal pressure; and, in any hose construction the reinforcing elements should be applied at or close to this angle in order to obtain highest burst strength and good stability under pressure. However, it will be appreciated that it is not always practical to apply the reinforcing means at this exact angle especially with hose constructions having a plurality of layers or plies whereby acceptable results may be obtained applying the reinforcing means at an angle ranging between 50° and 60°.

In the preceding discussion, attention was given to hoop stress and end thrust only at one end of the hose construction. In actual practice, a second ply or layer portion of reinforcing elements is generally necessary to counteract the resultant of hoop stress and end thrust on the opposite end of the hose construction. The second ply or layer portion may be of any suitable known construction or may be similar to the first-named ply or layer portion while being arranged in an opposite sense to the first and this latter type of hose construction will be discussed in more detail in connection with the more detailed illustration of the hose construction 20 presented in FIG. 3.

Figure 3:
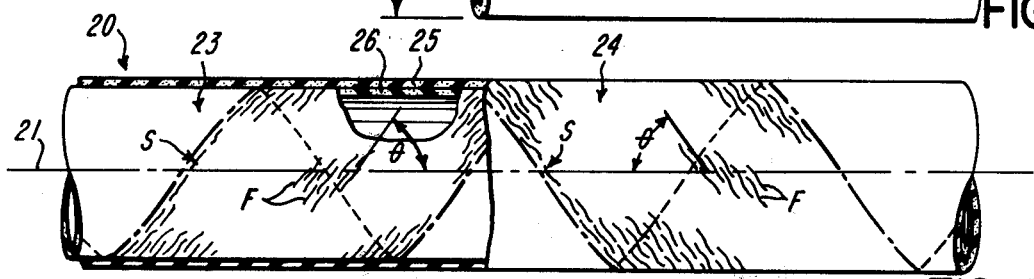
FIG. 3 is a view with parts in elevation, parts in cross section, and parts broken away particularly illustrating one exemplary embodiment of the hose construction of this invention.

As seen in FIG. 3, the exemplary hose construction 20 has its reference axis 21 as its central longitudinal axis and has what may be considered an inner layer portion 23 made primarily of an elastomeric material and another outer layer portion 24 bonded against the inner layer portion 23 and cured therewith as an integral part thereof. The outer layer portion 24 is made of an elastomeric matrix compound 25 having elongated fibers F embedded therein in substantially parallel relation with the fibers extending in a helical pattern about the axis 21 and with a predetermined angular relationship relative thereto or angle $\theta$ therebetween which as previously explained is preferably 54° and 44' and which from a practical view may be considered an angle of 55°. The inner layer portion 23 is also made of an elastomeric matrix compound 26 having elongated fibers also designated by the letter F embedded therein in substantially parallel relation with the fibers F of the inner layer 23 also extending in a helical pattern about the axis 21 with a predetermined angular relationship relative thereto or angle $\theta$ therebetween which is also preferably 54° and 44' and as before is considered an angle of 55°.

The helical pattern of the fibers F of the inner layer portion 23 extend in a direction opposite from the helical pattern of the fibers F of the outer layer portion 24. In particular, it will be seen from the illustration of FIG. 3 that the fibers F of the outer portion 24 may be considered as extending in a clockwise helical pattern when viewed from the left end of the hose construction 20 while the fibers F of the inner portion 23 may be considered as extending in a counterclockwise pattern when viewed from the same end.

The hose construction 20 eliminates reinforcing means provided in similar hose constructions provided heretofore in that the hose construction 20 is made up of two basic layer portions, namely portions 23 and 24, and each portion 23 and 24 has reinforcing means in the form of reinforcing fibers F embedded in its associated elastomeric matrix 26 and 25 respectively as an integral part thereof. In particular, the fibers F of each portion are oriented with respect to the longitudinal axis 21 of the hose construction 20 so that the composite of fibers and associated matrix exhibit a high Young's modulus and "mechanical anisotropy." The phrase "mechanical anisotropy" is intended to mean that the tensile modulus in the direction of fiber orientation is much higher than the tensile modulus in a direction transverse to the fiber orientation such as at right angles thereto, for example.

The fiber orientation of fibers F in the hose construction 20 is suitably obtained by the unique method of this invention and in a manner which will be described in more detail subsequently but in any event it will be appreciated that the fibers F of the inner layer portion 23 extend in parallel relation and essentially end-to-end so that groups or sets of aligned fibers may be and are obtained. Each set of aligned fibers may be considered as a strand similar to the strand S previously described and shown in FIG. 1. Therefore, and as explained before, each strand s comprised of a large number of end-to-end fibers F is arranged at an angle $\theta$ generally of the order of 55° with the central longitudinal axis 21. The fibers F of the outer layer portion 24 are similarly arranged to define what may be considered strands S at the opposite helix angle, as previously mentioned, and the strands are similarly arranged at an angle $\theta$ generally of the order of 55° with respect to the central longitudinal axis 21.

The fibers F of the layer portions 24 and 23 are arranged with oppositely wound helix lead angles, i.e., clockwise and counterclockwise respectively, whereby portions 23 and 24 cooperate and provide the hose construction 20 with optimum burst strength and a dimensional stability which was only possible heretofore with a much more expensive hose construction.

The matrix compound 25 used to define portion 24 and the matrix compound 26 used to define portion 23 may be the same or different elastomers and in applications where they are different, they should be compatible so that they may be readily bonded together upon curing of the hose construction. Further, it will be appreciated that each elastomeric matrix material or compound should be such that the fibers F dispersed therethrough are bonded in a tenacious manner so that the compound and fibers form a composite or matrix-like mass having controllable and determinable properties.

Any suitable material or matrix compound may be utilized to define the matrix compound 26 of the inner layer 23 and for applications such as for automotive radiator applications such an elastomeric material is selected so that it has a comparatively high oil and heat resistance. One compound that has been used successfully is an acrylo-nitrile butadiene rubber and is popularly referred to as NBR. Similarly, the matrix material for the layer 24 is preferably selected so that it has a high heat and ozone resistance and one compound which has been used successfully for this purpose is a compound of an ethylene propylene diene terpolymer which is popularly referred to as EPDM.

Figure 4:
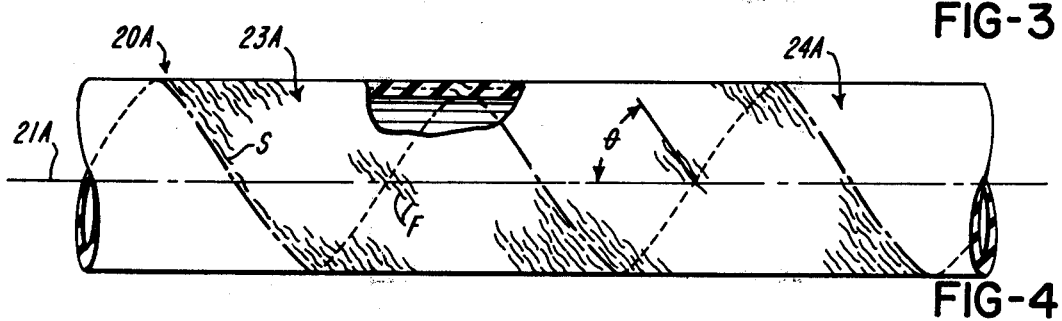
FIG. 4 is a view similar to FIG. 3 illustrating another exemplary embodiment of the hose construction of this invention.
Figure 5:
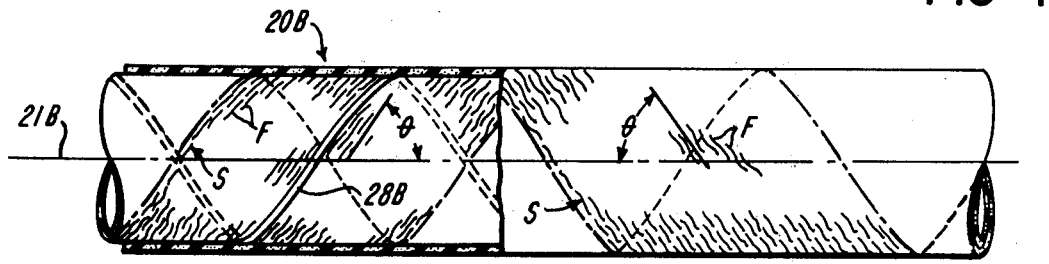
FIG. 5 is a view similar to FIG. 3 illustrating another exemplary embodiment of a hose construction like the construction of FIG. 3 which also has a helically wound reinforcing wire provided as an integral part thereof.
Figure 6:
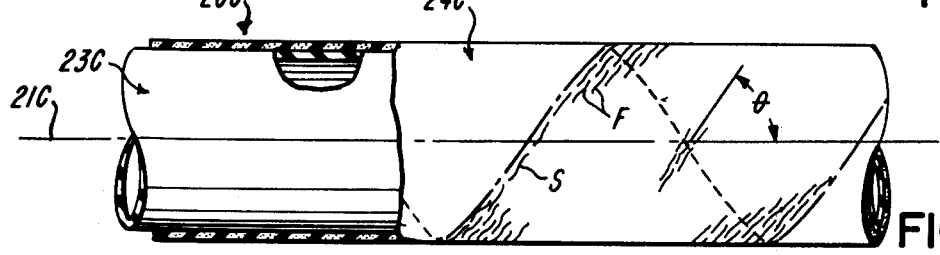
FIG. 6 is a view similar to FIG. 3 illustrating another exemplary embodiment of the hose construction of this invention.

Other exemplary embodiments of the hose constructions of this invention are illustrated in FIGS. 4, 5, and 6. The hose constructions illustrated in FIGS. 4, 5, and 6 are similar to the hose construction 20; therefore, such hose constructions will be designated by the reference numerals 20A, 20B and 20C respectively and representative parts of each hose construction which are similar to corresponding parts of the hose construction 20 will be designated in the drawings by the same reference numeral as in the hose construction 20 (whether or not such components are mentioned in the specification) followed by an associated letter designation, either A, B or C and not described again in detail. Only those component parts of each hose construction which are substantially different from corresponding parts of the hose construction 20 will be designated by a new reference numeral also followed by the associated letter designation and described in detail.

The hose construction 20A of FIG. 4 is also comprised of an inner layer portion 23A and a layer portion 24A and it will be seen that the portions 23A and 24A each have fibers F extending so that the fibers of each layer are arranged in strands S of the character previously defined and all of the strands S extend at substantially the same helix angle $\theta$ generally of the order of 55° with the longitudinal axis 21A.

The hose construction 20B of FIG. 5 is substantially identical to the hose construction 20 with the exception that it has an inextensible elongated strength member 28B bonded between the layers 23B and 24B and the member 28B cooperates with the fibers F and serves to improve the structural strength of the hose construction 20B and in particular serves to prevent collapse of the hose due to negative pressure or kinking due to severe flexure. The strength member 28B may be made of any suitable metallic or non-metallic material and in this example of the invention is shown as being made of a metal wire which is also wound or arranged in a helical pattern concentrically around portion 23B and, although the wire 28B is shown wound at an angle $\theta$ of roughly 55° it may be wound at any suitable angle either greater or less than 55°.

The hose construction 20C of FIG. 6 is shown with a plain inner layer portion 23C made of a suitable elastomeric material and an outer layer portion 24C bonded against the inner portion 23C as an integral part thereof with the portion 24C having elongated fibers F embedded therein in substantially parallel relation and with the fibers extending in a helical pattern about the axis 21C and with a predetermined angular relationship generally of the order of 55° relative thereto.

In each exemplary hose construction 20, 20A, 20B and 20C disclosed herein reference is made to an inner layer portion and an outer layer portion such as 23 and 24 respectively of hose construction 20. These portions in each hose construction 20 and 20A – 20C are not separable but are a unitary single-piece mass. It is obvious that they have been described as layer portions to emphasize the detailed construction thereof. In addition, it will be noted that ribbon-like strips have been shown by dot-dash lines in the drawings. Obviously, these are not lines or actual junction locations. These dot-dash lines emphasize that the associated layer portion was initially made by a method employing an elastomeric ribbon having parallel fibers therein as will be described later.

Having described the various embodiments of the hose construction of this invention in the form of hose constructions 20, 20A, 20B and 20C, the detailed description will now proceed with the improved method of this invention which may be employed to make each of these hose constructions. In particular, certain method steps are fully applicable to all hose constructions and will now be described briefly in connection with FIG. 7. Accordingly, the steps comprise placing, as shown at 30, an uncured inner layer portion on an associated mandrel, which may be either a solid or tubular mandrel, having a right circular cylindrical outside surface. An elongated ribbon of uncured elastomeric matrix material is provided, see the block shown at 31, which has elongated reinforcing fibers parallel the elongated dimension of the ribbon and the fibers are suitably provided in parallel relation and embedded in the material using any suitable technique known in the art. The uncured elongated ribbon is then wrapped, as shown by the block at 32, in a helical pattern against the inner layer portion (regardless of whether the inner layer portion is 23 of the hose construction 20, 23A of 20A, 23B of 20B, or 23C of 20C) with the ribbon and fibers extending in a helical pattern about a central longitudinal axis, and at an angle $\theta$ relative thereto, of the inner layer portion to define an assembly. The assembly is then suitably cured, as shown by the block at 33, to thereby simultaneously bond the layers together as a unit and define a hose construction. The curing may be achieved using any suitable technique known in the art and in one application of this invention, steam curing was employed and after curing the completed hose construction was suitably cooled and stripped from the mandrel in accordance with well-known techniques.

Figure 7:
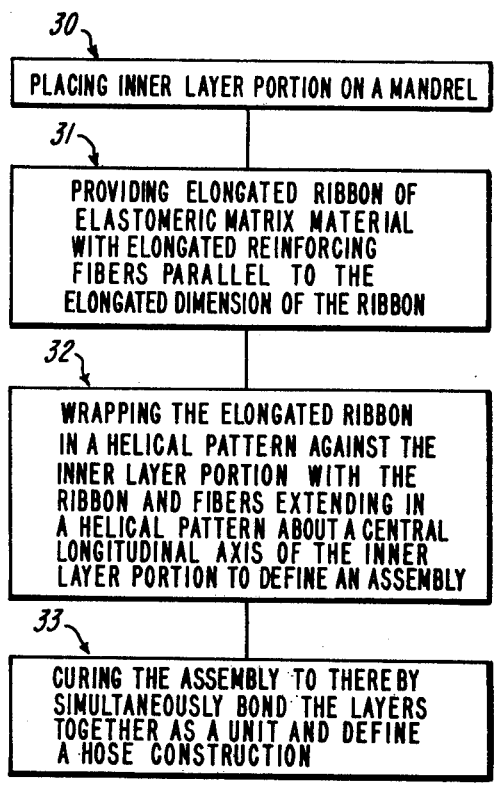
FIG. 7 is a block presentation of the method of this invention which may be employed to make the various hose construction illustrated and described herein.

Having described the method of this invention in connection with FIG. 7 of the drawings, the detailed presentation will now proceed with particular emphasis on any method steps which are varied in order to produce the various hose constructions 10, 10A, 10B or 10C.

Figure 8:
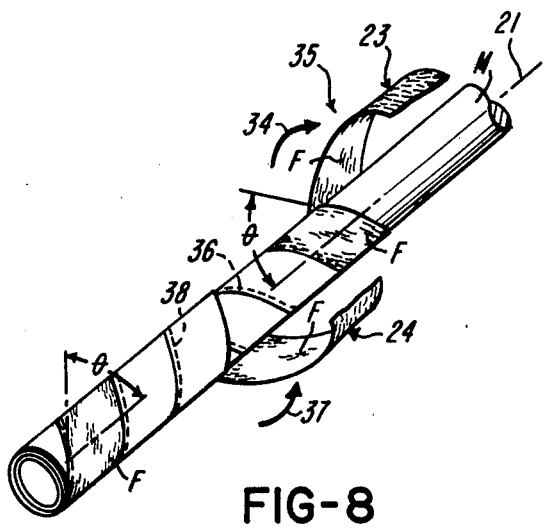
FIG. 8 illustrates a special method step which comprises the method steps of FIG. 7 and is employed to make the hose construction of FIG. 3.

In particular, it will be seen from FIG. 8 that in making the hose construction 20 the step of placing an inner layer 23 on a mandrel M comprises the steps of providing an uncured elongated ribbon, also designated by the reference numeral 23, of elastomeric matrix material having elongated reinforcing fibers F embedded therein substantially parallel to its elongated dimension. The ribbon 23 is then wrapped in one sense or direction, i.e., clockwise as shown at 34 and as viewed from the left end of FIG. 8, in a helical pattern against the mandrel M whereby the ribbon and its fibers F extend in a clockwise helical pattern about the axis 21 and with a predetermined angular relationship or angle $\theta$ generally of the order of 55° relative to the central longitudinal axis of the inner layer which is also the central axis of the mandrel to define the inner layer 23. The winding or wrapping action is achieved as shown at 35 and is illustrated in the drawings with adjoining turns of the ribbon 23 in slight overlapping relation as shown at 36 and the winding is achieved, as mentioned above, so that the fibers F extend at a right hand helix angle $\theta$ for the inner layer 23 as illustrated in the completed hose construction 20 of FIG. 3.

After layer or ribbon 23 has been placed on the mandrel M, another ribbon or uncured outer ribbon 24 is wound in an opposite sense or helical pattern against layer 23 whereby layer 24 is wound counterclockwise as viewed from the left end of FIG. 8 and as shown at 37. As previously described in connection with the ribbon 23, the ribbon 24 and fibers F extend in a helical pattern about the axis and with a predetermined angular relationship or angle $\theta$ relative to the central axis to define the uncured assembly of the block shown at 32 in FIG. 7. The winding of ribbon 24 is achieved with a slight overlap as shown at 38.

In presenting the winding of ribbons 23 and 24 to define hose construction 20 each ribbon has been wound with a slight overlap as shown at 36 and 38 in FIG. 8. However, it will be appreciated such ribbons may be wound with associated edges in abutting relation without an overlap. Further, once the assembly is cured the overlapped portions essentially smooth out and flow together as a unitary mass.

Figure 9:
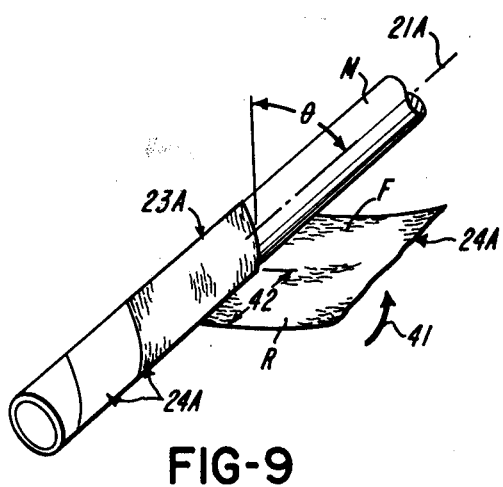
FIG. 9 illustrates a special method step which comprises the method steps of FIG. 7 and is employed to make the hose construction of FIG. 4.

The variation in the method steps of FIG. 7 used to define the hose construction 20A is illustrated by method steps in FIG. 9 wherein the placing and wrapping steps described in FIG. 7 and illustrated by the blocks 30 and 32 respectively are achieved in one counterclockwise wrapping action shown at 41 by wrapping an elongated uncured double width ribbon R about the mandrel M so that the last one of each turn adjoins and overlaps a preceding turn by an approximately 50% overlap as shown at 42 in FIG. 9, whereupon the inner layer portion 23A is defined and the outer layer portion 24A of the hose construction 20A is simultaneously defined. It will also be seen that the ribbon R and all fibers F of the layers 23A and 24A extend in the same helical sense or direction and at the same helix angle $\theta$ of roughly 55°.

The main variation of the method steps of FIG. 7 used to define the hose construction 20B consists, in essence, of first wrapping the elongated ribbon similar to ribbon 23 about the mandrel M in the manner described in connection with FIG. 8, then wrapping the inextensible elongated strength member 28B made of metallic wire and in a helical pattern against the first-wrapped ribbon whereupon the outer ribbon similar to ribbon 24 is wrapped in position. The strength member 28B is also wrapped at an angle $\theta$ of roughly 55% relative to the axis of the assembly defined by the wrapped ribbons.

Figure 10:
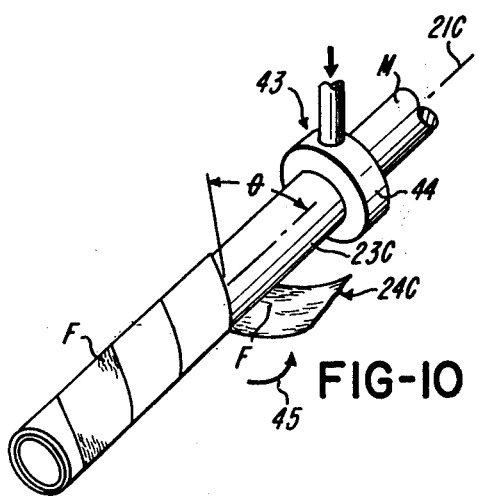
FIG. 10 illustrates a special method step which comprises the method steps of FIG. 7 and is employed to make the hose construction of FIG. 6.

The variation in the method steps utilized to define the hose construction 20C consists in placing an uncured plain seamless sleeve-like member 23C which defines the inner layer 23C on the mandrel M. This placement is achieved by using a well known extruding apparatus 43 having a head 44 as shown in FIG. 10. After sleeve-like portion 23C is in position an outer ribbon 24C is suitably wound in a counterclockwise manner as shown at 45 with the ribbon 24C and its fibers F being at an angle $\theta$ relative to the axis of the sleeve 23C and mandrel M.

In this disclosure of the invention, the various hose construction have been illustrated and described above as straight or rectilinear hose constructions with plain uncorrugated walls. However, it will be appreciated that the principles of this invention may be utilized to provide hose constructions having non-rectilinear configurations whereby curved mandrels, or the like, may be employed in the curing stage. In addition, corrugated elastomeric hose constructions may be provided using fixed or moving mold means and suitable vacuum and/or pressure equipment. Curved and corrugated hose constructions of this invention will now be discussed.

Still other exemplary embodiments of the hose construction of this invention are illustrated in FIGS. 13, 15, 16, 20, 21, and 22. The hose constructions illustrated in FIGS. 13, 15, 16, 20, 21 and 22 are similar to the hose construction 20; therefore, such hose constructions will be designated by the reference numerals 20D, 20E, 20G, 20H, 20J, and 20K respectively, and representative parts of each hose construction which are similar to the corresponding parts of the hose construction 20 will be designated in the drawings by the same reference numeral as in the hose construction 20 (whether or not such parts are mentioned in the specification) followed by an associated letter designation, either D, E, G, H, J, and K and not described again in detail. Only those component parts of each hose construction which are substantially different from corresponding parts of the hose construction 20 will be designated by a new reference numeral also followed by the associated letter designation and described in detail.

The hose construction 20D of FIG. 13 has a reference axis 21D which extends in a curved path as seen in FIG. 11 and at 46D in FIG. 12 and such hose construction 20D comprises an inner layer portion 23D made primarily of an elastomeric matrix material having randomly distributed elongated fibers F embedded therein in substantially parallel relation with the fibers extending in a helical pattern about the axis 21D at an angle relative thereto and with the fibers F providing reinforcement for the hose construction 20D. The hose construction 20D has another layer portion 24D bonded against the first-named or inner layer portion 23D as an integral part thereof with the other layer portion 24D also being made primarily of an elastomeric matrix material having randomly distributed elongated fibers F embedded therein in substantially parallel relation and with the fibers of the other layer portion 24D also extending in a helical pattern about the axis 21D in a direction opposite from the helical pattern of the fibers of the first-named or inner layer portion 23D. Thus, with the fibers F of one layer portion disposed in one direction about the curved axis 21D and the fibers of the other layer portion disposed in a helical pattern in another direction about the curved axis 21D the hose construction has optimum structural integrity and the fibers F of each layer portion 23D and 24D extend at the angle $\theta$ of 55° relative to axis 21D and such fibers serve as the main reinforcement means for the hose construction 20D. The layer portions 23D and 24D are of approximately equal thickness however, it will be appreciated that such layers may be of different thicknesses.

The hose construction 20D may be made utilizing any suitable technique known in the art and in this example is made by forming a tubular construction 47D which may be made in a similar manner as illustrated in FIG. 8 and the tubular construction 47D is shown as being made utilizing a pair of elongated ribbons of uncured elastomeric matrix material having randomly distributed elongated fibers embedded therein. The tubular construction 47D is disposed on a curved mandrel 50D which extends in a curved path so that the reference axis of the mandrel and of the tubular construction 47D also extend in a curved path and the axis of the mandrel is designated by the reference numeral 21D as in the completed hose construction 20D.

The mandrel 50D with the tubular construction 47D disposed thereon is then placed in a curing device 51D of any suitable known conventional construction whereupon the tubular construction 47D is cured at the correct temperature dicated by the elastomeric material and the layers 23D and 24D comprising the tubular construction 47D are formed together as a unitary single-piece homogenous mass to define the hose construction 20D. The cured hose construction 20D is then removed from the mandrel 50D and is cooled resulting in the completed hose construction 20D of FIG. 13 and as mentioned earlier such hose construction extends in a curved path as defined by the curved path of the mandrel 50D even though FIG. 13 shows only a straight portion of the hose construction 20D.

The hose construction 20E of FIG. 15 is comprised of an inner layer portion 23E and an outer layer portion 24E and each of these layer portions is made from a comparatively wide sheet of uncured elastomeric matrix material which is bias cut from an elongated sheet 52E thereof, as illustrated in FIG. 14, and the sheet 52E may be cut from a supply roll (not shown) thereof. The sheet 52E of elastomeric matrix material has elongated reinforcing fibers F embedded therein in substantially parallel relation and the sheet 52E is cut along cut lines defining cut edges 53E. The inner layer portion 23E is defined by a bias cut portion of sheet 52E and is wrapped in position against its associated mandrel M so that the fibers F may be considered as being arranged in strands S of the character previously described and all of the strands S and fibers F of the layer 23E extend at substantially the same helix angle $\theta$ of roughly 55° with respect to the longitudinal axis 21E of the hose construction 20A. To assure optimum structural integrity for the hose construction, the inner layer portion 23E is arranged about the mandrel M to provide a longitudinal overlapping portion 54E which extends substantially parallel to the longitudinal axis 21E.

The outer layer portion 24E is made from a portion of sheet 52E and is similarily arranged around the mandrel M concentrically around and against the inner layer portion 23E to provide a longitudinal overlapping portion 55E; and, with the layer portion being made from a bias cut sheet the reinforcing fibers F thereof are disposed or arranged in a sense or direction opposite from the sense or direction of the fibers F of the inner layer portion 23E. The fibers F of the outer layer portion 24E also extend at substantially the same helix angle $\theta$ of 55° with the longitudinal axis 21E of the hose construction 20E and the fibers F of layer 24E may also be considered as extending in strands S.

The hose construction 20E is defined by suitably curing the assembly of layers 23E and 24E on mandrel M in a similar manner as described in connection with block 33 of FIG. 7 for the hose construction 20. Further, the layers 23E and 24E have their respective overlapped areas 54E and 55E at diametrically opposite positions.

The hose construction 20G of FIG. 16 is comprised of four layer portions made from comparatively wide sheets of uncured elastomeric matrix material which is bias cut in a similar manner as illustrated in FIG. 14 for the hose construction 20E. The hose construction 20G has a longitudinal axis 21G and an inner layer portion 23G wrapped around a mandrel M and provided with a longitudinal overlapping portion 56G. A second layer portion 24G is provided around and against layer portion 23G and has a longitudinal overlap 57G displaced 90° from the overlap 56G. A third layer portion 60G is provided around layer portion 24G and has a longitudinal overlap 61G displaced 90° from the overlap 57G. Finally a fourth layer portion 62G is provided around layer portion 60G and has a longitudinal overlap (not visible in FIG. 16) which is displaced 90° from the overlap 61G.

In each of the layer portions 23G, 24G, 60G and 62G the fibers F of adjacent layers are arranged or disposed in opposite directions relative to the longitudinal axis 21G and in each layer portion such fibers are arranged at a helix angle of roughly 550° with the longitudinal axis 21G of hose construction 20G. Accordingly, it is seen that for the innermost layer portion 23G of the hose construction 20G the fibers F extend in a helical path at an angle of roughly 55° with the longitudinal axis 21G in one direction, the fibers F of the layer 24G extend at the same helix angle of roughly 55° with the longitudinal axis 21G however in another direction, the fibers F of the layer 60G extend at a helix angle of roughly 55° with the longitudinal axis 21G and in the same direction as the fibers F of the layer 23G, and the fibers F of the layer 62G extend at a helix angle of roughly 55° wth the longitudinal axis 21G in an opposite direction from the layer 60G and in the same direction or sense as the fibers F of the layer 24G. The hose construction 20G is defined after suitably curing the assembly of layers 23G, 24G, 60G and 62G and after disposing such layers about their mandrel M in a similar manner as described in connection with block 33 of FIG. 7 for the hose construction 20.

As described above, the four layer portions of hose construction 20G have their longitudinal overlapped areas displaced 90° apart. Similarly, the layer portions 23E and 24E of the hose construction 20E have longitudinally overlapped portions at diametrically opposite locations. These arrangements of the overlapped portions assure that each associated hose construction is free of unsightly bulges or the like.

Further, the overlapped portions have been illustrated in an exaggerated manner in the completed hose constructions 20E and 20G as shown in FIGS. 15 and 16; however, it will be appreciated that in the completed hose constructions the overlapped portions are very difficult to detect because during the curing of the layer portions the overlapped portions as well as the adjoining layer portions are cured together as a single piece unitary mass. It will also be appreciated that the overlapped portions have been shown in an exaggerated manner to highlight the manner in which each associated hose construction, either 20E or 20G, is made.

The corrugated hose construction 20H of FIG. 20 is also comprised of an inner layer portion 23H and an outer layer portion 24H and it will be seen that each of the layer portions 23H and 24H has integral fibers F embedded therein. Further, and in a similar manner as described previously in connection with other embodiments of the hose construction of this invention the fibers F of layers 23H and 24H extend in opposite directions or senses; however, the elongated fibers of each layer portion each extends at substantially the same helix angle $\theta$ of roughly 55° relative to the longitudinal axis 21H.

The hose construction 20H has axially spaced corrugations designated by the general reference numeral 65H which provide improved flexibility therefor and such corrugations are defined by alternating crests 66H and troughs 67H which have a substantially uniform wall thickness. In particular, and as best illustrated in FIG. 20A such substantially uniform wall thickness is such that the wall thickness of the crests indicated typically at 70H in FIG. 20A is no more than 20 – 35 percent greater than the wall thickness of the troughs indicated typically at 71H. Further, this substantially uniform wall thickness is due to the hose construction 20H being formed from a partially cured tubular construction in a detailed manner as will be described subsequently. It will also be seen that the tubular construction 20H also has substantially right circular cylindrical end portions 72H which enable easy attachment of the hose construction 20H to associated tubular components, or the like.

The hose construction 20H may be made utilizing any suitable technique or method known in the art and as presented in FIG. 18 such hose construction is preferably made by first forming, as indicated by the block 73, an uncured elongated tubular construction having a reference axis and at least one layer (and in this example a plurality of two layers 23H and 24H) made primarily of an elastomeric matrix material with the matrix material having randomly distributed elongated reinforcing fibers embedded therein in substantially parallel relation and with the fibers extending in a helical pattern about the axis of the tubular construction at an angle $\theta$ of roughly 55° relative thereto. The tubular construction used to make the hose construction 20H may be defined utilizing any of the techniques disclosed in this application and previously described or to be subsequently described. The uncured tubular construction depending upon the manner in which it is made may be of extended length of the order of several hundred feet and defined by uncured layer portions or such tubular construction may be close to the desired length of the final hose construction 20H. For example, if the uncured tubular construction were to be made in accordance with the techniques disclosed in FIGS. 14, 15, and 16 it would preferably be made of a length which would define the completed hose construction 20H.

Nevertheless, the uncured or green tubular construction regardless of how made is then partially cured in a controlled environment and such partial curing is indicated by the block 74 in FIG. 18.

The partially cured tubular construction is then placed in a mold device having axially spaced corrugations comprising its wall means as indicated by the block 75 of FIG. 18; and, such step is also shown in FIG. 19 which illustrates a mold device 76 having axially spaced corrugations 77 defining its wall means and the corrugations 77 extend in a helical pattern and serve to define the axially spaced corrugations 65H of the hose construction 20H.

The final forming and curing of the partially-cured tubular construction is indicated by the block 80 of FIG. 18 and suitable fluid pressure means peferably in the form of steam 81 is introduced through a conduit 82 of the mold device 76 at a predetermined substantial pressure whereupon the partially-cured plain tubular construction is urged against the wall means 77 of the mold device 76 while subjecting such tubular construction to a controlled environment of the mold device, including temperature, to form (upon cooling) a fiber-reinforced hose construction 20H having axially spaced corrugations defined by alternating crests 66H and troughs 67H of substantially uniform wall thickness. The temperature of the steam 81 and the temperature of the mold device 76 may be controlled utilizing suitable means and techniques known in the art whereby the final forming and curing is achieved under a controlled temperature and pressure for a predetermined known time interval to define the fiber reinforced corrugated hose construction 20H with its integral ends 72H.

The final forming of the hose construction 20H employing a plain tubular construction or assembly which has first been partially cured has several important advantages. In particular, the final forming of a tubular construction which has first been partially cured results in a hose construction 20H which is free of flashing, or the like, because there is little or no tendency for the tubular construction or blank which has been partially cured to extrude through the parting lines of the mold device itself. Further, by first partially curing the tubular construction and then final forming and curing there is less tendency for the material to thin out at the troughs thereof as would be the tendency if the corrugated hose construction 20H were to be made without first partially curing such tubular construction.

The amount of partial-curing of the tubular construction will vary depending upon the detailed composition of the fiber-loaded elastomeric composition and the amount of partial-curing may range between 10 – 90 percent of the amount of final curing. Thus, by partial-curing within the range specified the corrugated wall 65H is of substantially uniform wall thickness wherein the crests 66H are no more than 20 – 35 percent greater in thickness than the troughs 67H and there is better control of mold flash and consequently elimination of the need to deflash the hose construction 20H after final forming and curing thereof. It will also be appreciated that by partially curing the tubular construction it is very simple to seal against internal steam pressure as provided in the mold device 76 and this may be accomplished by the utilization of comparatively simple plugs 83 and 84 as component portions of the mold device 76.

The hose construction 20H is shown as having a plurality of two layers 23H and 24H which are shown as distinct layers for ease of description and presentation; however, as previously explained it will be appreciated that such layers are in reality a single piece substantially homogenous mass defined during curing and in reality there is no parting line between layers 23H and 24H.

The hose constructions described previously in this disclosure have been defined by final curing of various tubular assemblies without the need for partial-curing thereof and each of these hose constructions has been defined by utilizing either ribbons, sheets, plain tubular extrusions, and the like; however, it will be appreciated that each of the tubular constructions employed to make the hose construction described heretofore may also be employed in making corrugated hose constructions such as the hose construction 20H by first partially curing the associated tubular construction and then final forming and curing the hose construction essentially as disclosed herein.

The terms "curing" and "partially curing" have been used herein as they relate to molded hose constructions in accordance with this invention. In general, it is preferable to make the hose construction of this invention using a "vulcanizable rubber." The term "vulcanizable rubber" indicates an elastomeric material which has chemically active sites present on, or associated with, the long chain molecules which provide the physical basis for the unique behavior of this class of materials.

The action of vulcanization or curing means the reaction of these chemically active sites either with each other, or more generally with an added polyfunctional vulcanizing or curing agent. The vulcanizing or curing reaction is usually triggered by an input of energy, generally in the form of heat, but other forms of energy such as ultra violet radiation or electron beam radiation can be used.

The physical result of vulcanization or curing is to tie the individual long chain molecules together at various points along their length by cross links consisting of chemical bonds. Before cure, individual molecules in the mass are free to slip past one another, that is the uncured elastomer may flow and it exhibits little or no elastic memory. After curing the individual molecules are tied to one another and flow becomes impossible - in effect the whole mass may be considered as becoming a single giant molecule. The cured elastomer may still be deformed, but after removal of the force producing deformation, the material will attempt to recover its original shape, that is, it exhibits pronounced elastic memory.

The number of cross links formed during the curing reaction depends on many things, including reactivity of the elastomer, reactivity of the curing agent, time of reaction, and temperature or intensity of other energy source. As the number of cross links increases, however, properties of the material change in a way that reflects the fact that movement of one long chain molecule relative to another becomes progressively more limited. Thus hardness, modulus, elastic memory and tensile strength increase with increasing level of cure (modulus may be considered or defined as resistance to deformation).

The "ultimate" state of cure (level of cross-linking) is not a unique state. In technological terms, "ultimate cure" corresponds to some desired set of physical properties. This level of cure may be reached in a single curing step as disclosed for the hose construction 20, for example, or it may be found convenient to break it down into two (or more) curing steps. In the case where curing is achieved in two separate steps, as disclosed for the hose construction 20H, for example, the material is said to be partially cured after completion of the first curing step and before commencement of the second curing step.

The hose construction 20J of FIG. 21 is very similar to the hose construction 20H except for the fact that such hose construction 20J has a reinforcing member in the form of a helical wire 85J which is formed or coiled in a helical pattern to correspond to the helical pattern of the crests 66J and troughs 67J. The coiling of the wire reinforcing member 85J may be achieved independently of hose 20J utilizing any suitable machine such as a spring making machine of known construction whereupon such helically coiled spring reinforcing wire 85J may then be inserted within the completed hose construction 20J which may be defined in a substantial identical manner as the hose construction 20H. The wire 85J supports the inside surfaces of its hose construction 20J beneath the crests 66J as indicated at 86J in FIG. 21 to provide added strength for the hose construction 20J against internal collapse or the like.

The corrugated hose construction 20K of FIG. 22 is very similar to the hose construction 20H and has a central reference axis 21K, an inner layer portion 23K, an outer layer portion 24K, end portions 72K, and axially spaced corrugations. However, such corrugations instead of being helical corrugations are in the form of annular corrugations and designated by the reference numeral 87K. Further, it will be appreciated that the hose construction 20K is made utilizing method steps which are substantially identical to the method steps described in connection with the hose construction 20H and as presented in FIG. 18 of the drawings.

Reference has been made in this disclosure to the forming of a tubular construction utilizing an elongated ribbon of elastomeric matrix material as disclosed in FIGS. 7 and 8 or bias cut sheets as disclosed in connection with FIGS. 14–16, for example, and in each instance the fiber loaded ribbons or sheets are preformed or premade and then wrapped in tubular form to provide fibers F at the desired angle relative to the axis of the tubular construction being defined. However, it will be appreciated that a tubular hose construction having a plurality of layers may be made or formed with the fibers F of each layer being correctly aligned all in basically one step. For example, an extrusion apparatus 90 as illustrated in FIG. 17 may be employed and the apparatus 90 may be provided with a suitable supply of flowable elastomeric matrix material (having elongated fibers F of reinforcing material dispersed therethrough) through a conduit 91. The extrusion apparatus 90 has a mandrel M of substantial length operatively associated therewith for movement therethrough in a substantially rectilinear path which coincides with the longitudinal axis 94 of the mandrel M. The extrusion apparatus 90 also has a pair of rotating extrusion die devices (not shown) and each of these rotating die devices is supplied with fiber reinforced elastomeric material which is provided to apparatus 90 through the conduit 91. Each of these die devices is adapted to extrude a ribbon of elastomeric material and the die orifice of each device is such that the elongated fibers F are extruded parallel to the elongated dimension of the ribbon simultaneously with the extrusion of the ribbon. The rotating die devices of the extrusion apparatus 90 rotate about the axis 94 and thus mandrel M as the mandrel M moves rectilinearly through the apparatus 90 with one of the pair of die devices rotating in a clockwise manner while the other of the pair of die devices is rotating in a counterclockwise manner and with the pair of devices each extruding its fiber-loaded ribbon of elastomeric matrix material. A tubular construction which is substantially identical to the tubular construction defined in FIG. 8 is thus simultaneously provided with the extrusion or formation of elongated ribbons of uncured fiber-loaded elastomeric matrix material and this is achieved by placing the leading end of a first ribbon from one of the rotating devices against the mandrel M as it is moved axially through the apparatus 90 to define an inner tubular layer, designated by the reference numeral 23, concentrically around the mandrel M. Once a short length of this inner tubular layer has been defined the leading end of a second ribbon from the other of the pair of rotating die devices is placed against the first tubular layer 23 and wound by its rotating device to define an outer tubular layer designated by the reference numeral 24. The fibers of this outer layer will be disposed in an opposite direction or sense.

Thus, the tubular construction thus defined has its inner layer portion 23 with fibers F thereof extending in one direction or sense at an angle of roughly 55° relative to the longitudinal axis 94 of the tubular construction and its outer layer portion 24 with fibers F which extend in an opposite direction at an angle of roughly 55° relative to the longitudinal axis 94 whereby the tubular construction defined by apparatus 90 is defined in a continuous process. The mandrels M associated with apparatus 90 may be suitably constructed or treated to allow easy removal of the continuously made tubular construction, and each mandrel may be of a type which is operatively associated with other identical mandrels in end-to-end relation. Once a particular mandrel has had a tubular construction defined along its entire length and concentrically around adjoining portions of adjoining mandrels the continuous tubular construction thus defined may be cut adjacent the ends of the particular mandrel and such mandrel removed from within the tubular construction.

Molded flexible hose constructions such as hose constructions 20H, 20J, and 20K may be used to replace so-called OEM style preformed curved hose used on automobile radiators.

The pressures and temperatures normally encountered in radiator hose service may range from 7 to 20 psig and 175 to 250° F respectively whereby satisfactory service under these conditions dictates the use of a reinforced hose and the integral fiber reinforcement provided in the hose constructions of this invention is comparatively inexpensive yet provides outstanding results. As is well known the incorporaton of reinforcing means by previously proposed techniques such as knitting, braiding, or in the form of a treated woven fabric is relatively slow and expensive in terms of materials and labor.

Test comparing examples of hose constructions of this invention with typical hose constructions proposed heretofore will now be presented.

TEST 1

A 1½ inch I.D. plain hose construction identified as construction A was made by wrapping two plies of anisotropic fiber-loaded tape or ribbon around a mandrel, crosswrapping with nylon webbing and curing in open steam. The elastomer material used in this hose was an NBR stock compounded with wood cellulose fibers supplied by the Monsanto Company and of the character described later. Additional plasticizer (DOP, 5%) was added to improve handling characteristics and the ribbon was calendered in the laboratory at 0.050 inch thickness and 5.8 inch width.

A first ply of the ribbon was wrapped on a mandrel at 50% overlap, followed by a second ply (opposite lead). The whole tubular assembly or construction thus defined was then crosswrapped with nylon tape and cured 60 minutes at 300° F in open steam. Total wall thickness was 0.200 inch.

For comparison purposes, two additional hose constructions identified as hose constructions B and C were made.

Hose construction B was a non-reinforced hose built by laminating regular NBR hose stock around a 1½ inch mandrel to a total wall thickness of 0.180 inch, followed by crosswrapping and curing 60 minutes at 300° F.

Hose construction c was a knit reinforced hose built by extruding a 1½ inch I.D. base tube from regular EPDM hose stock to 0.110 inch ga. followed by knitting with 1 ply of 1800 denier rayon cord (lockstitch, 9 courses per inch), application of the cover in a crosshead extruder to a total wall of 0.180 inch, and curing on a 1½ inch mandrel for 60 minutes at 300° F. using nylon crosswrap.

Pressure test data on hose constructions A, B, and C are presented in the following Table 1.

TABLE 1

EFFECT OF PRESSURE ON STRAIGHT HOSE SAMPLES

| Pressure (psi) | Hose Construction | | | | | |
|---|---|---|---|---|---|---|
| | A | | B | | C | |
| | *ΔL(%) | ΔD(%) | ΔL(%) | ΔD(%) | ΔL(%) | ΔD(%) |
| 0 | 0 | 0 | 0 | 0 | 0 | 0 |
| 25 | +2 | +1½ | +45 | +170 | −1 | +6 |
| 50 | +3 | +3½ | — | — | −2 | +7 |
| 75 | +3 | +4 | — | — | −2½ | +9 |
| 100 | ±4 | +4½ | — | — | −3 | +11 |
| 125 | +4½ | +5 | — | — | — | — |
| Burst (psi) | 150 | | 50 | | 125 | |

*ΔL(%) = % change in hose length from original.
ΔD(%) = % change in hose O.D. from original To define a corrugated hose construction of the type disclosed herein several lengths or blanks of the spiral tape wrapped hose (approximately 18 inches long) were partially cured for 10 minutes at 290° F. in open steam. The partially cured blanks were then final formed and cured in a standard device similar to device 76 of FIG. 19 as follows:

Total time in device (mins.) - 7.75
Internal steam pressure - 120 psi.
Steam pressure on platens - 120 psi.

The resultant product was trimmed at each end, and a 0.064 inch gauge galvanized steel wire helix of the correct pitch, O.D. and length was inroduced into the corrugated section of the hose construction to prevent its collapse.

The finished product hose construction was flexible and stable under the application of pressure. Burst strength was found to be 110 psi, and this provides an adequate safety margin for radiator service as envisaged for this hose. As pressure was increased there was a tendency for the hose to elongate; this "accordion" effect is due in part to the straightening of the molded-in corrugations as pressure is applied.

TEST 2

In this instance a 1½ inch I.D. uncured extruded fiber reinforced tubular construction with 0.165 inch wall was provided and such tubular construction had elongated fibers suitably aligned relative to its longitudinal axis, in a similar manner as disclosed in this disclosure, to provide effective resistance against internal pressure.

A portion of this extruded tubular construction was placed on a 1½ inch diameter mandrel and cross-wrapped with nylon tape. The assembly was cured 23 minutes at 350° F in steam and cooled resulting in hose construction D.

As before, a standard knit reinforced EPDM hose construction identified as E was build for purposes of comparison. This sample was prepared by extruding a 1½ inch I.D. base tube from regular EPDM tube stock to 0.110 inch gauge, followed by knitting with 1 ply of 1650 denier rayon cord (lockstick, 8–9 courses per inch) and application of the cover in a crosshead extruder to a total wall gauge of 0.180 – 0.200 inch. This sample was cured on a 1½ mandrel for 23 minutes at 300° F using nylon crosswrap. Upon cooling, hose construction E resulted.

Pressure test data on these hose were as follows:

TABLE 2

EFFECT OF PRESSURE ON STRAIGHT HOSE SAMPLES

| Pressure (psi) | Hose Construction | | | |
|---|---|---|---|---|
| | D | | E | |
| | *ΔL(%) | ΔD(%) | ΔL(%) | ΔD(%) |
| 0 | 0 | 0 | 0 | 0 |
| 20 | +0.8 | +1.8 | −2.0 | +5.8 |
| 40 | +2.4 | +2.7 | −3.2 | +8.3 |
| 80 | +5.2 | +7.2 | −5.6 | +15.8 |
| 100 | +7.2 | +9.0 | — | — |
| 120 | +11.2 | +16.2 | — | — |
| Burst (psi) | 160 | | 120 | |

*ΔL(%) = % change in hose length from original
ΔD(%) = % change in hose O.D. from original Several 18 inch lengths of the tubular construction defined similarly to tubular construction for hose construction D were partially cured 10 minutes at 290° F. in open steam. The partially cured blanks were subsequently final formed and cured in a standard device similar to device 76 of FIG. 19 as follows:

Total time in device (minutes - 15.5
Internal steam pressure - 120 psi
Steam pressure on platens - 120 psi The completed hose construction was trimmed at each end, and a 0.064 inch gauge galvanized steel wire helix of the correct pitch, O.D. and length was introduced into the convoluted section of the hose to prevent collapse.

When subsequently tested the finished product was found to be flexible and acceptably stable under the application of pressure. Burst strength was 120 psi., providing a good safety margin for radiator hose service. The "accordion" effect was more noticeable in this example, and the hose showed approximately 50% elongation immediately before burst. As previously noted, part of this elongation is due to the straightening of the molded-in corrugations as pressure is applied, but as the data in Table 2 indicate, hose construction D itself shows appreciable increase in length under pressure. However, the length change at "normal" (i.e. operating) pressures did not appear to be excessive or detrimental to the proper functioning of the hose.

The fibers F which are utilized in the various hose constructions and in the ribbons used to make such hose constructions may be made of any suitable material. Good results have been obtained using wood cellulose fibers manufactured by the Monsanto Company of St. Louis, Missouri, and such fibers are sold under the registered trademark of SANTOWEB. In one embodiment these fibers had an elastic modulus of 2 to 5 × $10^6$ psi and a tensile strength of 6 to 9 × $10^4$ psi with an average diameter of 8 to 16 microns and a length of 1 to 3 millimeters. These fibers are further described in U.S. Pat. Nos. 3,836,412 and 3,709,845, and as disclosed therein are suitably treated to promote bonding thereof in the elastomeric matrix.

In this disclosure of the invention the various hose constructions have been illustrated and described as being made of various portions which are made of elastomeric matrix material having fibers F embedded therein. It will be appreciated that any suitable elastomeric material may be employed, including natural and synthetic rubber compounds, as well as suitable plastic materials.

In this disclosure of the invention the hose construction 20A is shown with an inner layer portion 23A and a layer portion 24A each having fibers F extending so that the fibers of each layer are arranged in strands S of the character previously defined and all of the strands S extend at substantially the same helix angle relative to the longitudinal axis 21A. However, it is to be understood that the hose construction 20A may, in many applications, also have another pair of layer portions similar to the layer portions 23A and 24A wound at the same helix angle $\theta$ relative to the longitudinal axis 21A while being wound in an opposite sense, whereby such a hose construction would in essence have four layer portions defined by the layer portions 23A and 24A as shown plus another pair of layer portions similar to layer portions 23A and 24A which are similarly defined and wound in an opposite sense.

The hose construction 20C is shown in the drawings as a plain inner layer portin 23C; however, it is to be understood that such inner layer portion may be a conventionally defined inner layer portion made using any suitable technique known in the art with reinforcing means (not shown) therein of any presently known construction. In addition, the inner layer portion 23C may be made using an extruding apparatus 43 as illustrated in FIG. 10 with the flowable elastomeric material being extruded through such apparatus having reinforcing means similar to the fibers F dispersed therein in an embedded manner so that upon extrusion of the elastomeric material to define the inner layer portion 23C the fibers extruded in position at the correct helical relation relative to the longitudinal axis of its hose and provide reinforcing means for layer portion 23C simultaneously with the forming of such layer portion.

Each of the hose constructions 20, 20A, 20B, and 20C may be provided with an additional inexpensive outer cover in accordance with techniques which are well known in the art. Similarly, each of these hose constructions may be provided with an inner liner which may be for a special purpose, such as resistance to chemical corrosion, for example, or such inner liner may be of a comparatively expensive material and with a wall thickness which is much smaller than would normally be provided for an inner layer portion and for the purpose of assuring that the hose construction is free of pin-hole leaks, or the like.

While present exemplary embodiments of this invention and methods of practicing the same have been illustrated and described, it will be recognized that this invention may be otherwise variously embodied and practiced within the scope of the following claims.

What is claimed is:

1. A hose construction having a fixed reference axis which extends in a curved path and comprising, a first layer portion made primarily of an elastomeric matrix material having randomly distributed elongated fibers embedded therein in substantially parallel relation, all of said fibers of said first layer portion extending in a helical pattern about said axis at a particular angle relative thereto, and a second layer portion bonded to said first layer portion as an integral part thereof, said second layer portion being made primarily of an elastomeric matrix material having randomly distributed elongated fibers embedded therein substantially in parallel relation, all of said fibers of said second layer portion also extending in a helical pattern about said axis at a particular angle relative thereto although in a direction opposite from the helical pattern of the fibers of said first layer portion, said fibers serving as the main reinforcement means for said hose construction.

2. A hose construction as set forth in claim 1 in which said second layer portion is bonded against said first layer portion and said fibers in each layer portion extend at substantially the same though opposite particular angle relative to said reference axis.

3. A hose construction as set forth in claim 2 in which said layer portions are of approximately equal thickness and each of said fibers has a length of three millimeters or less.

4. A hose construction having a reference axis and axially spaced corrugations providing flexiblity with said corrugations being defined by alternating crests and troughs, said hose construction comprising, a first layer portion made primarily of an elastomeric matrix material having randomly distributed elongated fibers embedded therein in substantially parallel relation, all of said fibers of said first layer portion extending in a helical pattern about said axis at a particular angle relative thereto, and a second layer portion bonded to said first layer portion as an integral part thereof, said second layer portion being made primarily of an elastomeric matrix material having randomly distributed elongated fibers embedded therein in substantially parallel relation, all of said fibers of said second layer portion also extending in a helical pattern about said axis at a particular angle relative thereto although in a direction opposite from the helical pattern of the fibers in said first layer portion, said fibers serving as the main reinforcement means for said hose construction.

5. A hose construction as set forth in claim 4 in which said fibers of each layer portion extend at substantially the same though opposite particular angle relative to said reference axis and said crests and troughs have a substantially uniform wall thickness due to said crests and troughs having been formed with said layer portions in a partially-cured condition.

6. A hose construction as set forth in claim 5 in which said second layer portion is bonded against said first layer portion and said elastomeric matrix material of said layer portions is a rubber compound.

7. A hose construction as set forth in claim 4 in which said elastomeric matrix material of each of said layer portions is a rubber compound and said layer portions are a single-piece unitary mass.

8. A hose construction as set forth in claim 5 wherein said axially spaced corrugations are axially spaced annular corrugations.

9. A hose construction as set forth in claim 5 wherein said axially spaced corrugations are helical corrugations defined by a continuous helical corrugation.

10. A hose construction as set forth in claim 5 in which said spaced corrugations defined by said alternating crests and troughs have said substantially uniform wall thickness and the wall thickness of said crests is no more than 35% greater than the wall thickness of said troughs due to having been formed with said layer portions in said partially cured conditions.

11. A hose construction as set forth in claim 5 in which spaced corrugations defined by said alternating crests and troughs have said substantially uniform wall thickness and the wall thickness of said crests is no more than 35% greater than the wall thickness of said troughs due to having been formed with said layer portions in said partially-cured condition which consists of said layer portions having been partically cured between 10 and 90% of their state of final cure.

12. A hose construction as set forth in claim 11 wherein the wall thickness of said crests is no more than 10 to 35% greater than the wall thickness of said troughs due to having been formed with said layer portions in said partially-cured condition.

* * * * *

UNITED STATES PATENT OFFICE
CERTIFICATE OF CORRECTION

Patent No. 4,013,101   Dated March 22, 1977

Inventor(s) Arthur D. Logan et al.

It is certified that error appears in the above-identified patent and that said Letters Patent are hereby corrected as shown below:

Column 5, lines 52 to 62 should be $$\text{Tan } \theta = \frac{2}{\text{Tan } \theta} \quad \text{or} \quad \text{Tan}^2 \theta = 2 \qquad \text{Equation 7}$$

Equation 7 may be written:

$$\text{Tan } \theta = \sqrt{2} = 1.414 \qquad \text{Equation 8 --}$$

Col. 11, line 60, "dicated" should be -- dictated --

Col. 12, line 67, "550°" should be -- 55° --

Col. 18, line 58, "c" should be -- C --

Col. 21, line 30, "portin" should be -- portion --

Signed and Sealed this second Day of August 1977

[SEAL]

Attest:

RUTH C. MASON
Attesting Officer

C. MARSHALL DANN
Commissioner of Patents and Trademarks